United States Patent
Jeong

(10) Patent No.: US 8,849,349 B2
(45) Date of Patent: Sep. 30, 2014

(54) METHOD AND APPARATUS FOR SELECTING IDENTITY MODULE OF MOBILE TERMINAL SUPPORTING PLURAL IDENTITY MODULES

(75) Inventor: Seog Hee Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/285,134

(22) Filed: Oct. 31, 2011

(65) Prior Publication Data

US 2013/0012208 A1  Jan. 10, 2013

(30) Foreign Application Priority Data

Jul. 4, 2011  (KR) .................. 10-2011-0065770

(51) Int. Cl.
  *H04M 1/00* (2006.01)
  *H04W 8/18* (2009.01)
  *H04W 48/18* (2009.01)

(52) U.S. Cl.
  CPC .............. *H04W 8/183* (2013.01); *H04W 48/18* (2013.01)
  USPC ........ 455/558; 455/557; 455/556.1; 455/411; 455/423

(58) Field of Classification Search
  USPC ....................... 455/558, 557, 556.1, 411, 423
  See application file for complete search history.

(56) References Cited

U.S. PATENT DOCUMENTS

| | | | |
|---|---|---|---|
| 6,178,335 B1 * | 1/2001 | Vu | ................................ 455/558 |
| 2008/0064443 A1 | 3/2008 | Shin et al. | |
| 2009/0186651 A1 | 7/2009 | You | |
| 2009/0186656 A1 * | 7/2009 | Jain | ............................... 455/558 |
| 2011/0081951 A1 | 4/2011 | Hwang | |

FOREIGN PATENT DOCUMENTS

| | | | | |
|---|---|---|---|---|
| JP | 2007-235492 | * | 9/2007 | ............... H04Q 7/38 |
| JP | 2007-235492 A | | 9/2007 | |
| JP | 2007235492 | * | 9/2007 | ............... H04Q 7/38 |
| KR | 10-1026247 B1 | | 3/2011 | |
| WO | 2010/140781 A2 | | 12/2010 | |

* cited by examiner

*Primary Examiner* — Manpreet Matharu
(74) *Attorney, Agent, or Firm* — Jefferson IP Law, LLP

(57) ABSTRACT

A method and apparatus for selecting one of multiple identity modules attached to a mobile terminal is provided. The method includes selecting a network, detecting identity modules corresponding to the network, selecting one of the detected identity modules, and connecting to the network using the selected identity module. The identity module selection method enables automatic selection of one of multiple identity modules attached to a mobile terminal without cumbersome user manipulation.

15 Claims, 6 Drawing Sheets

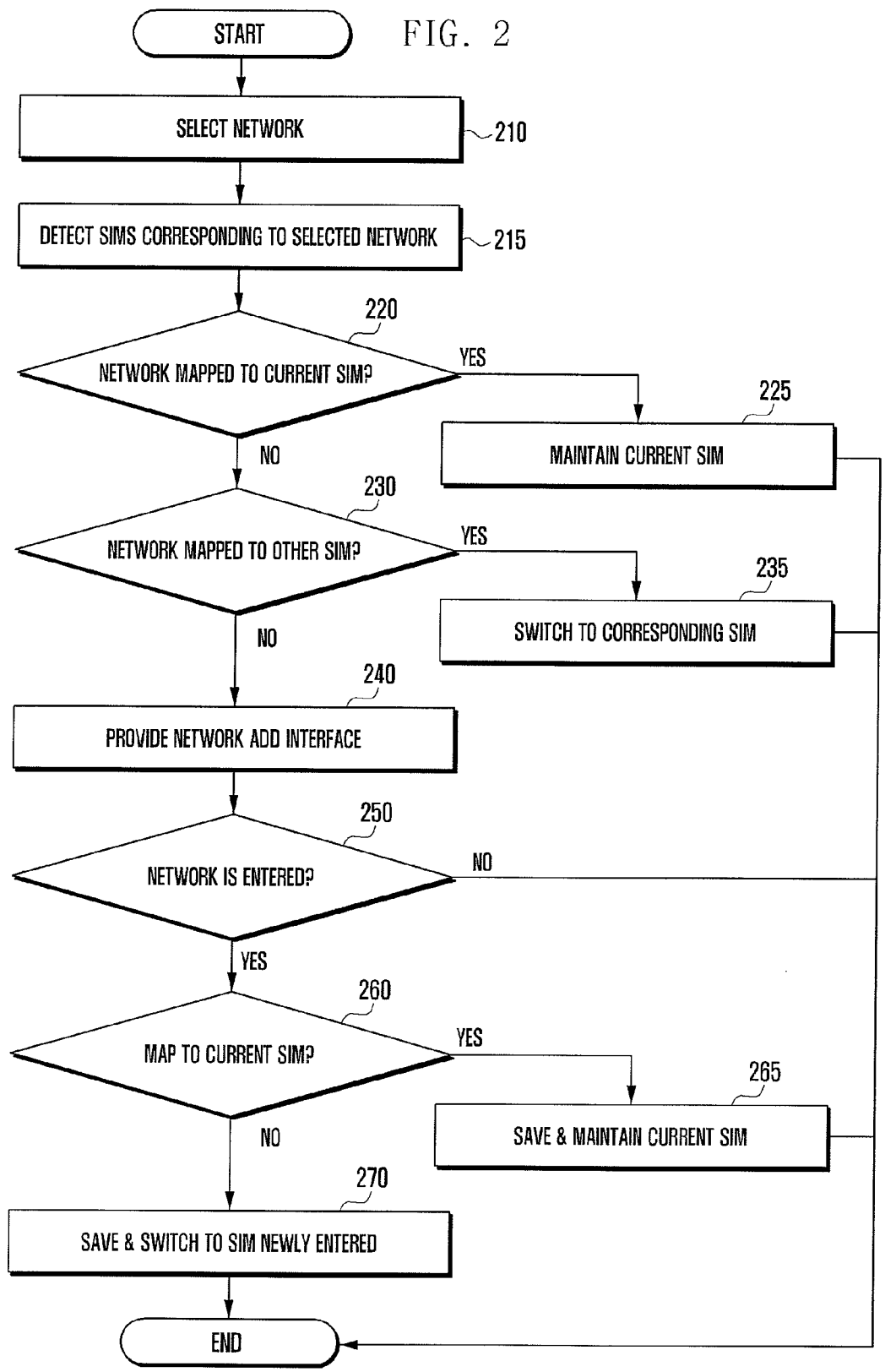

METHOD AND APPARATUS FOR SELECTING IDENTITY MODULE OF MOBILE TERMINAL SUPPORTING PLURAL IDENTITY MODULES

PRIORITY

This application claims the benefit under 35 U.S.C. §119(a) of a Korean patent application filed on Jul. 4, 2011 in the Korean Intellectual Property Office and assigned Serial No. 10-2011-0065770, the entire disclosure of which is hereby incorporated by reference.

BACKGROUND OF THE INVENTION

1. Field of the Invention

The present invention relates to an identity module selection method and apparatus. More particularly, the present invention relates to a method and apparatus for automatically selecting one of multiple identity modules attached to a mobile terminal.

2. Description of the Related Art

Mobile terminals are presently in widespread use. Recent mobile terminals are equipped with an identity module for identifying the subscriber. A mobile terminal connects to a network using the information recorded in the identity module. The identity module may include, among others, a Subscriber Identity Module (SIM), a Universal SIM (USIM), and a Universal Integrated Circuit Card (UICC). While the following description is directed toward SIM cards for convenience, the description is equally applicable to other types of identity modules.

More recently, mobile terminals supporting two or more SIMs are being developed and commercialized. Mobile terminals capable of holding two SIMs are referred to as dual SIM mobile terminals. The user can insert two SIMs into the mobile terminal, such as one for business use and the other for personal use. It is also possible to configure the mobile terminal to switch between the two SIMs for the office and home.

Even though the same network is used, billing rates may change depending on which SIM is activated. Particularly when using roaming services, the difference between the billing amounts of the cases using two different SIMs is likely to increase. Accordingly, the dual SIM mobile terminal is configured such that the user can manually select a SIM that is most advantageous in terms of cost for the current network.

However, the multi SIM mobile terminal typically requires the user to change the SIM through a cumbersome menu manipulation or by a SIM switching key input, resulting in user inconvenience. Assuming the case of using SIM A and SIM B, if the user selects the SIM B by mistake despite the cost reduction advantage of SIM A in the current network, the user has to pay for the unnecessary cost imposed.

SUMMARY OF THE INVENTION

Aspects of the present invention are to address at least the above-mentioned problem and/or disadvantages and to provide at least the advantages described below. Accordingly, an aspect of the present invention is to provide an apparatus and method for selecting one of the Subscriber Identity Modules (SIMs) attached to the multi-SIM mobile terminal automatically without cumbersome user manipulation.

In accordance with an aspect of the present invention, an identity module selection method of a mobile terminal having multiple identity modules is provided. The method includes selecting a network, detecting identity modules corresponding to the network, selecting one of the detected identity modules, and connecting to the network using the selected identity module.

In accordance with another aspect of the present invention, a mobile terminal having multiple identity modules is provided. The mobile terminal includes a network selector for selecting a network, an identity module detector for detecting identity modules corresponding to the network, an identity module selector for selecting one of the detected identity modules, and a radio frequency unit for connecting the mobile terminal to the selected network using the selected identity module.

In accordance with another aspect of the present invention, a mobile terminal is provided. The mobile terminal includes a plurality of identity modules, a display unit, a network selector for selecting a network, an identity module controller for determining whether any of the plurality of identity modules correspond to the selected network and for selecting one of the identity modules based on a result of the determination, and a radio frequency unit for connecting the mobile terminal to the selected network via the selected identity module.

Other aspects, advantages, and salient features of the invention will become apparent to those skilled in the art from the following detailed description, which, taken in conjunction with the annexed drawings, disclose's exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a flowchart illustrating an identity module selection method according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A Subscriber Identity Module (SIM) selection method and apparatus of a mobile terminal supporting multiple SIMs according to an exemplary embodiment of the present invention is described below with reference to the accompanying figures. A wireless communication system under the control of a specific mobile operator is referred to as a network. The network may be identified by a Mobile Country Code (MCC) and/or a Mobile Network Code (MNC).

Figure 1:
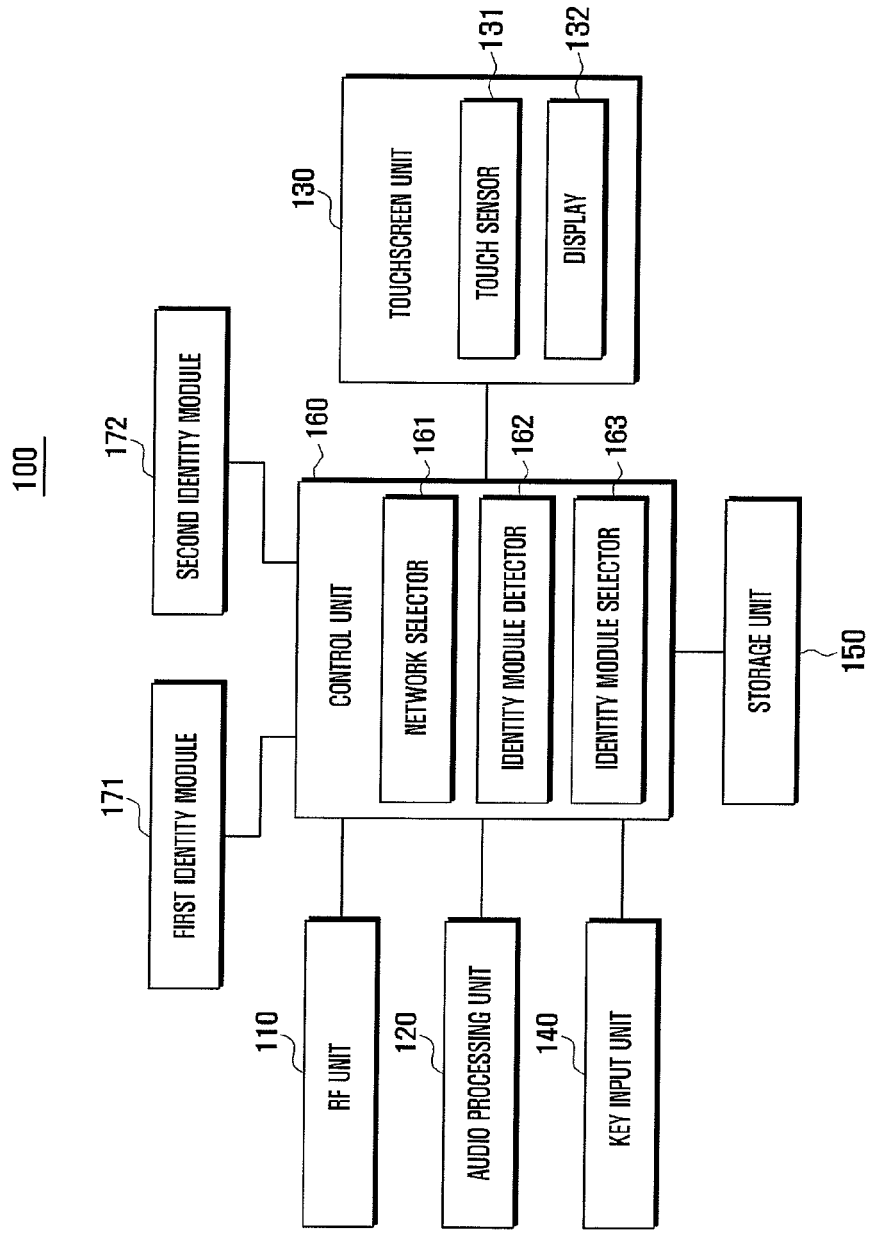
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal 100 includes a Radio Frequency (RF) unit 110, an audio processing unit 120, a touchscreen unit 130, a key input unit 140, a storage unit 150, and a control unit 160. The mobile terminal 100 may also include additional units. Similarly, the functionality of two or more units may be integrated into a single component.

The RF unit 110 is responsible for transmitting/receiving radio signals carrying data. The RF unit 110 may include an RF transmitter for up-converting and amplifying a transmission signal and an RF receiver for low noise amplifying and down-converting the received signal. The RF unit 110 outputs the data received over the radio channel to the control unit 160 and transmits the data output by the control unit 110 over the radio channel. The RF unit 110 establishes the connection to the network using the information contained in the SIMs 171 and 172 such that the network identifies the subscriber. The RF unit 110 connects the network using the SIM selected under the control of the control unit 160.

The audio processing unit 120 may include a codec pack, and the codec pack may include a data codec for processing packet data and an audio codec for processing an audio signal including voice. The audio processing unit 120 converts a digital audio signal to an analog audio signal by means of the audio codec to output the audio through a speaker (SPK) and converts the analog audio signal input through a microphone (MIC) to the digital audio signal by means of the audio codec.

The touchscreen unit 130 includes a touch sensor 131 and a display 132. The touch sensor 131 detects a touch input made by the user. The touch sensor may be implemented by one of a capacitive overlay, a resistive overlay, an infrared beam, and by a pressure sensor. The touch sensor 131 may also be implemented with other types of sensing devices for detecting contact or pressure made by an object. The touch sensor 131 detects a touch input made by the user and generates a detection signal to the control unit 160. The detection signal includes the coordinates at which the touch input is detected. When the user generates a continuous touch input, the touch sensor 131 generates the detection signal including the coordinates on the path of the contact to the control unit 160.

According to an exemplary embodiment of the present invention, the touch sensor 131 can stretch out an object item group to receive the user input made in the group. The user may generate an input by a touch gesture including multi-touch and drag gestures.

The display 132 may be implemented by a Liquid Crystal Display (LCD), Organic Light Emitting Diodes (OLED), and Active Matrix OLED (AMOLED) so as to provide the user with information such as menu of the mobile terminal 100, input data, and function setting information in the form of visual data.

The display 132 outputs the booting screen, standby mode screen, menu screen, call progress screen, and various application execution screens.

Although the description is directed to a mobile terminal equipped with a touchscreen, exemplary embodiments of the present invention may be applied to mobile terminals implemented without a touchscreen. In this case, the touchscreen unit 130 of FIG. 1 can be configured to include only the display 132.

The key input unit 140 generates a key signal for controlling the mobile terminal 100 that is output to the control unit 160 in response to the user's key manipulation. The key input unit 140 can be implemented with a keypad having numeric keys, navigation keys and functions keys arranged at a side of the mobile terminal. According to an exemplary embodiment of the present invention, when the mobile terminal 100 is fully controlled with the touchscreen unit 130, the key input unit 140 may be omitted.

The storage unit 150 stores programs and data used for the operations of the mobile terminal 100 and may be divided into a program region and a data region. The program region stores programs for controlling operations of the mobile terminal, an Operating System (OS) for booting up the mobile terminal 100, and application programs related to the playback of multimedia content and optional functions of the mobile terminal 100, such as a camera function, an audio playback function, still and motion picture playback function, and the like. The data region stores data generated in association with the operation of the mobile terminal 100, such as still and motion pictures, phonebook, and audio data.

According to an exemplary embodiment of the present invention, the storage unit 150 can store the information on the identity modules corresponding to a specific network. For example, the storage unit 150 may store the MCC and/or the MNC of the network to which the mobile terminal 100 connects with the Internal Mobile Subscriber Identity (IMSI) in the form of a match list. This can be expressed in a C language construct as shown in Table 1.

TABLE 1

```
Typedef struct
{
    char IMSI[15]:
    NetworkList_t *pList:
}SIMNetworkPreferenceList_t:
Struct NetworkList_t
{
    int MCC:
    int MNC:
    NetworkList_t *pNext:
}:
```

This storage structure is just an exemplary case. The identity module information may be any of various storage structures, such as an array or a map. The storage structure is described below with reference to FIGS. 2 to 4.

The control unit 160 controls overall operations of the function blocks of the mobile terminal 100. The control unit 160 includes a network selector 161, an identity module detector 162, and an identity module selector 163.

The network selector 161 selects the network to attach. The network may be identified with an MCC and/or an MNC. The network selection may be made by one of the following methods. The network selector 161 may select one of the connectable networks randomly. The search for the connectable network may be performed based on the Received Signal Strength Indication (RSSI), Signal-to-Noise Ratio (SNR), or other similar parameter. When the signal strength is greater than a preset value, or the signal quality is superior to a preset quality, the network selector 161 may determine that the network is connectable. The preset signal strength or the preset signal quality should be good enough to maintain the communication with the corresponding network.

In order to select a network, it is possible to use a parameter such as RSSI, Signal to Interference-plus-Noise Ratio (SINR), SNR, Carrier to Interference-plus-Noise Ratio (CINR), and Carrier to Interference Ratio (CIR). According to an exemplary embodiment of the present invention, the network selector 161 may select the network having the best signal quality, the highest signal strength among the connectable networks, or some combination thereof. The signal quality and signal strength may be measured with one of the aforementioned parameters.

The network selector 161 may select the network having the highest priority set by the user among the connectable networks. In this case, the priorities of the networks may be set by the user or by the mobile terminal manufacturer. The priority configuration is described below with reference to FIGS. 4 and 5. Any method of priority configuration may be employed.

The identity module detector 162 may detect the identity modules corresponding to the selected network. The user may set the default identity module to be used for connecting to a specific network. The information on the identity modules corresponding to the selected network is stored in the storage unit 150. The identity module detector 162 may detect the identity module corresponding to the selected network using the information stored in the storage unit 150.

Once the identity modules corresponding to the selected network are selected, the identity module selector 163 selects one of the detected identity modules. When a detected identity module is currently selected, the identity module selector 163 operates such that the mobile terminal communicates with the selected network using the selected identity module. Otherwise, when a specific identity module is not selected yet, the identity module selector 163 activates the SIM switch to select one of the detected identity modules. The identity module selector 163 operates such that the mobile terminal communicates with the selected network using the selected identity module. The SIM selection process is described below with reference to FIG. 2.

Both the first and second identity modules 171 and 172 may be inserted into the mobile terminal 100. The user can switch the first and second identity modules 171 and 172 with each other. The first and second identity modules 171 and 172 can be implemented as detachable devices or as fixed components of the mobile terminal 100.

FIG. 2 is a flowchart illustrating an identity module selection method according to an exemplary embodiment of the present invention.

Referring to FIG. 2, the network selector 161 selects a network to which the mobile terminal 100 connects in step 210. The network selection can be done according to one of several methods. For example, the network selector 161 may select one of the connectable networks randomly. A network should be selected when the mobile terminal 100 powers on. When the mobile terminal 100 cannot maintain the communication with the current network (i.e., when the signal strength weakens below a preset value or no other system is detected), another network may need to be selected. The network selection may be triggered by the user request. The network selection may also be triggered according to a predetermined condition.

The connectable network search may be performed based on the RSSI, SNR, or other similar parameter. The network selector 161 may select a network having a signal strength greater than a predetermined value or having a signal quality superior to a predetermined quality. The predetermined signal strength or the predetermined signal quality should be good enough to maintain the communication with the corresponding network. In order to select a network, it is possible to use one of RSSI, SINR, SIR, SNR, CINR, CIR, CNR, and other similar parameters. According to an exemplary embodiment of the present invention, the network selector 161 may select the network having the best signal quality, highest signal strength among the connectable networks, or some combination thereof. In order to measure signal quality or signal strength, the aforementioned parameters may be used.

The network selector 161 may select the network having the highest priority assigned by the user among the connectable networks. An exemplary priority assignment is described below with reference to FIGS. 4 and 5.

After selecting the network, the identity module detector 162 detects the identity modules corresponding to the selected network in step 215. A SIM is used as an exemplary identity module, but other types of identity modules may also be employed. The user may configure a default SIM to attempt connection to a specific network. The network-specific default SIM configuration is described with reference to steps 250, 260, 265, and 270. The information on the SIMs corresponding to the selected network is stored in the storage unit 150. The identity module detector 162 may detect the SIMs corresponding to the selected network using the information stored in the storage unit 150. In this case, the identity module detector 162 determines whether the identity information of the corresponding network is in the match list of the first SIM 171 and then in the match list of the second SIM 172. The information may be stored in the form shown in Table 1 or in another form. The method for analyzing the information may depend upon the form in which the information is stored.

The identity module selector 163 determines whether the selected network is mapped to the current SIM in step 220. The identity module selector 163 determines whether the selected network is connected to the selected SIM. In this case, it is assumed that the first SIM 171 is currently selected.

Figure 3A:
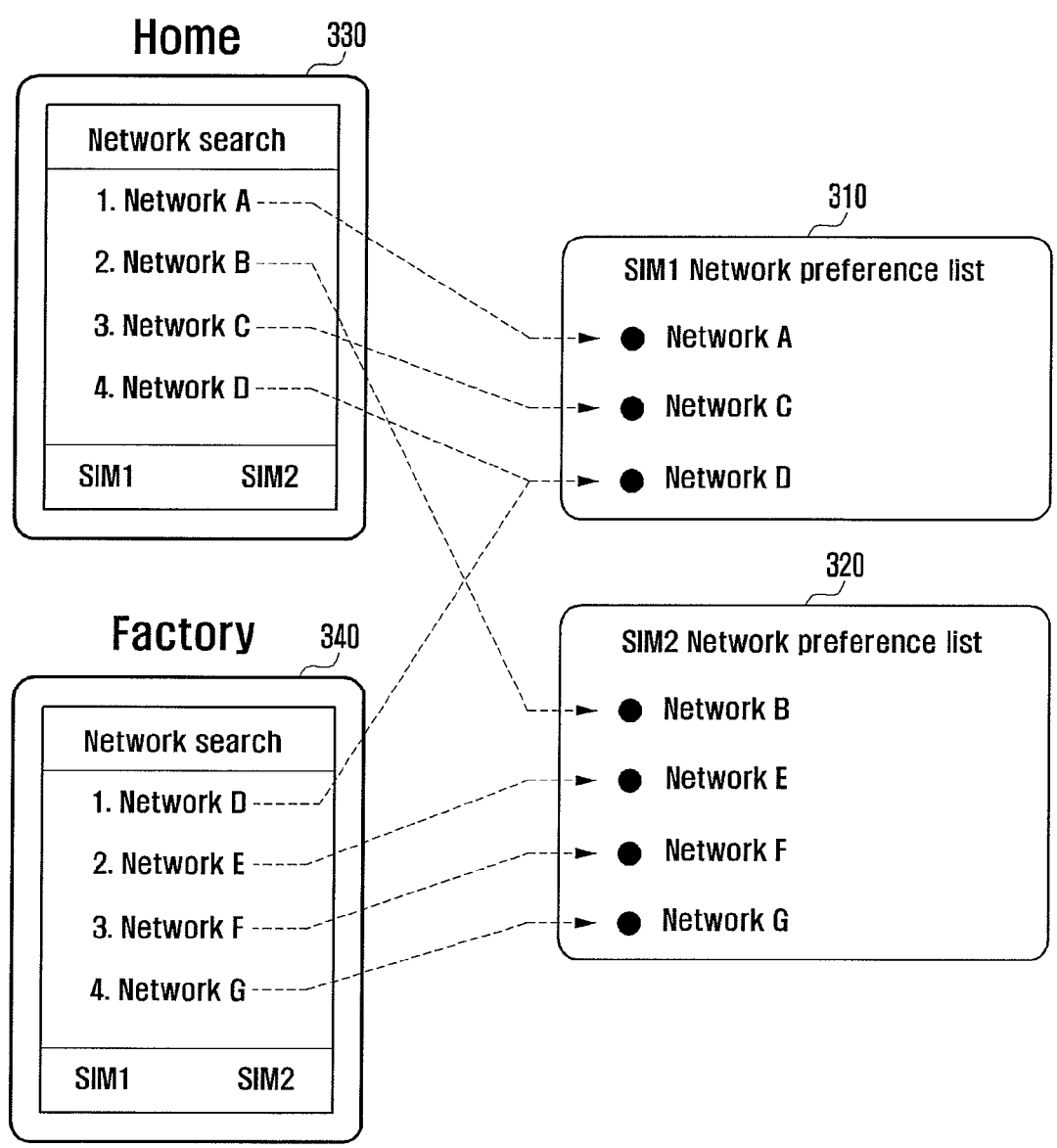
FIG. 3A is a diagram illustrating matches between Subscriber Identity Modules (SIMs) and networks in an identity module selection method according to an exemplary embodiment of the present invention.

FIG. 3A is a diagram illustrating matches between SIMs and networks in the identity module selection method according to an exemplary embodiment of the present invention.

Referring to FIG. 3A, a list 330 includes network A, network B, network C, and network D that are detected at the home of the user. A list 340 includes network D, network E, network F, and network G that are detected at the factory of the user. A first SIM network preference list 310 includes network A, network C, and network D. A second SIM network preference list 320 includes network B, network E, network F, and network G. If one of the networks A, C, and D is selected, the mobile terminal 100 selects the first SIM 171 automatically. If one of the networks B, E, F, and G is selected, the mobile terminal 100 selects the second SIM 172 automatically. The network lists 310 and 320 may be stored as shown in Table 1.

Returning to FIG. 2, suppose that the method of Table 1 is used as shown in FIG. 3A. If the combination of MNC and MCC of the selected network exists in the network preference list of the IMSI as the identifier of the first SIM 171, the identity module selector 163 determines that the selected network is the network mapped to the currently selected SIM at step 210. In this case, the procedure goes to step 225 to maintain the current SIM for communication without SIM switching. For example, if network A is selected, the SIM matched to the network A is the first SIM 171. If the first SIM 171 is selected, there is no need for SIM switching. Otherwise, if the selected network is not the network matched to the currently selected SIM, the procedure goes to step 230.

In step 230, the identity module selector 163 determines whether another SIM corresponds to the selected network. The identity module selector 163 determines whether the selected network is mapped to another SIM. If the first SIM 171 is currently selected, and the mobile terminal 100 selects network B, the second SIM 172 is selected as the match because network B is not included in the match list of the first SIM 171, as shown in FIG. 3A. If the combination of MNC and MCC of the selected network B exists in the network preference list of the IMSI as the identifier of the second SIM 172, the identity module selector 163 determines that the selected network is the network mapped to the currently selected SIM at step 230. In this case, the identity module selector 163 switches the identity module to the second SIM 172 in step 235. If no SIM is mapped to the selected network, the procedure goes to step 240.

The identity module selector 163 provides the user with a network add interface in step 240. If a new network is selected afterward, the user may enter the SIM to be mapped to the network. The identity module selector 163 determines whether a valid SIM is selected for the network in step 250. If the valid SIM is entered, the identity module selector 163 determines in step 260 whether the SIM entered by the user is the currently selected SIM.

If the SIM entered by the user is the currently selected SIM, the identity module selector stores the mapping information of the entered SIM matching the selected network in the storage unit 150 in step 265. In this case, the identity module selector 163 maintains the current SIM such that the mobile terminal performs communication with the currently selected SIM.

If the SIM entered by the user is not the currently selected SIM, the identity module selector 163 stores the mapping information of the SIM entered by the user matching the selected network in the storage unit 150 in step 270. In this case, the identity module selector 163 switches to the SIM entered by the user such that the mobile terminal performs communication with the switched SIM.

According to an exemplary embodiment of the present invention, when adding a network to a network preference list, the user can assign the priority of the added network. The priority assignment process is described later with reference to FIGS. 4 and 5.

Figure 3B:
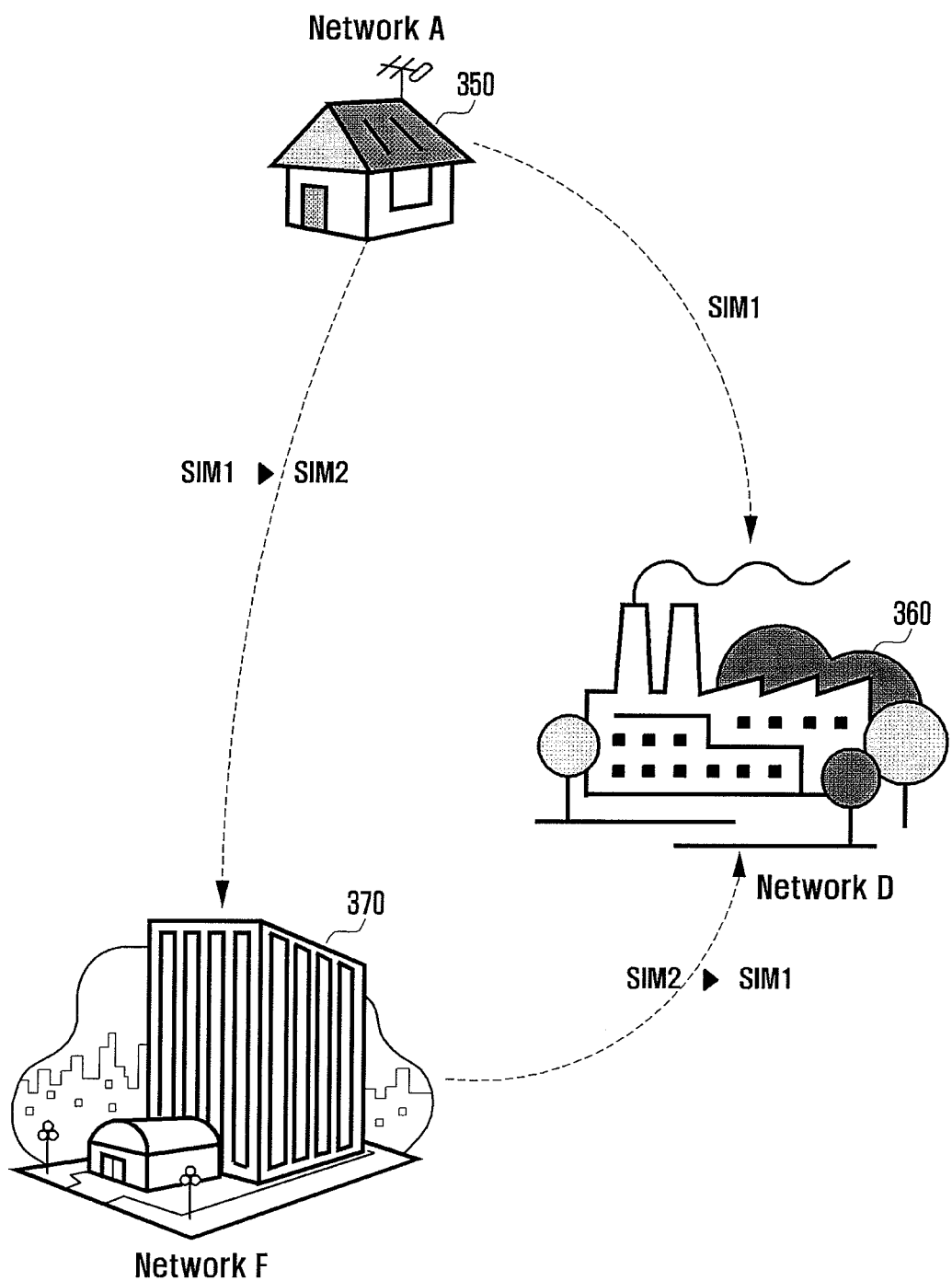
FIG. 3B is a diagram illustrating an exemplary situation requiring identity module selection of a mobile terminal according to an exemplary embodiment of the present invention.

FIG. 3B is a diagram illustrating an exemplary situation for identity module selection of a mobile terminal according to an exemplary embodiment of the present invention.

Referring to FIG. 3B, the mobile terminal is configured to select network A at the user's home 350, network D at the factory 360, and network F at the office 370. The mobile terminal selects the first SIM 171 matched with network A and network D at the user's home 350 and factory 360, respectively. The mobile terminal selects the second SIM 172 matched with network F at the office 370. Accordingly, when the mobile terminal moves from the home 350 to the office 370, it is necessary to switch from the first SIM 171 to the second SIM 172. When the mobile terminal moves from the office 730 to the factory 360, the mobile terminal switches from the second SIM 172 to the first SIM 171. However, there is no need for SIM switching when the mobile terminal moves from the home to the factory 360. According to an exemplary embodiment of the present invention, the SIM switching is performed automatically. The user can therefore always use the optimal SIM without manual selection.

Figure 4:
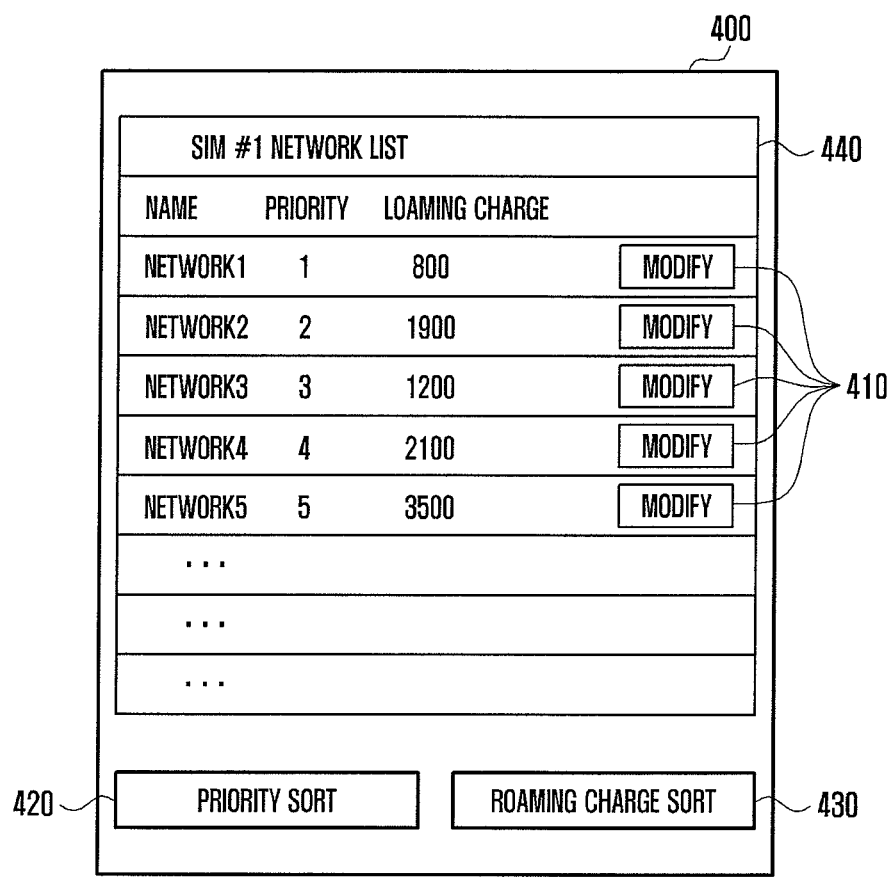
FIG. 4 is a diagram illustrating a SIM-specific network list for use in an identity module selection method according to an exemplary embodiment of the present invention.

FIG. 4 is a diagram illustrating a SIM-specific network list for use in an identity module selection method according to an exemplary embodiment of the present invention.

The mobile terminal 100 may provide the user with a SIM-specific network list edit screen 400. The network list edit screen 400 may include a network list 440, a priority sort button 420, and a roaming charge sort button 430. The network list edit screen 400 may be provided in response to a menu selection of the user. The network list 440 may include network name (identifier), priority, and roaming charge columns, as well as modification buttons 410. The roaming charge and priority are the exemplary items, and only one of the roam cost and priority items may be included in the network list. The roaming charge item may be replaced by a "call charge" item. The network list 440 may include at least one of user-assigned priority, roaming charge, and call charge items. The user-assigned priority item indicates that the item can be edited by the user. The priority may be determined by one or more of the items. Although there is no user-assigned priority item, the roaming charge item or the call charge item may be used as the priority item.

The user may select the modification buttons 410 to modify the user-assigned priority and roaming charge or call charge per record. The modification button may be replaced by or provided along with a deletion button. The user may select the deletion button to delete a specific network record from the network list 440. The user may also select the priority sort button 420 or the roaming charge sort button 430 to sort the networks in order of priority or roaming charge. The priority of the selected network can be determined according to the selected item for sorting. When the network list is sorted in order of the roaming charge, the network selector 161 selects the network based on the roaming charge. According to an exemplary embodiment of the present invention, the user may configure the network selection criteria of the network selector 161 on a separate configuration screen.

According to an exemplary embodiment of the present invention, the roaming charge and other cost information may be updated automatically in communication with the system. For example, when the mobile terminal enters a foreign country, the roaming charge can be updated automatically with the roaming charge information received from the corresponding network. The roaming charge information may be provided to the user in a separate method.

Figure 5:
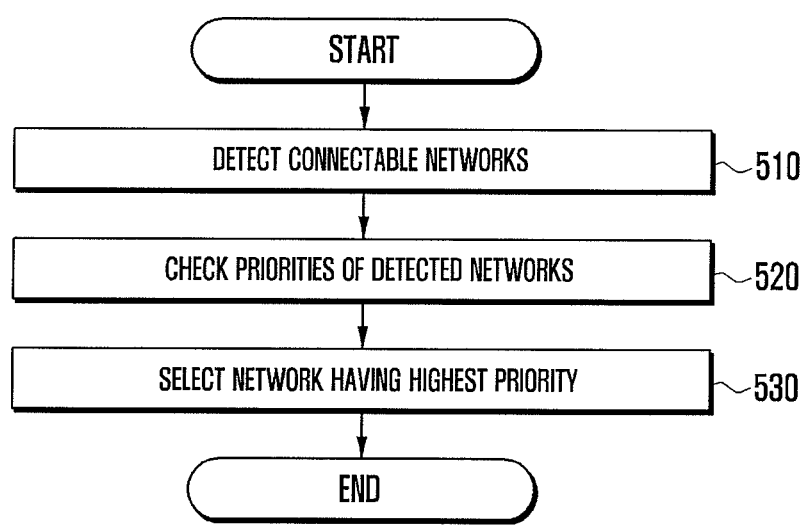
FIG. 5 is a flowchart illustrating a network selection procedure according to another exemplary embodiment of the present invention.

FIG. 5 is a, flowchart illustrating a network selection procedure according to another exemplary embodiment of the present invention.

The network selector 161 detects a plurality of connectable networks in step 510. For example, networks 2, 3, and 5 of FIG. 4 may be detected as the connectable networks.

The network selector 161 extracts the priorities of the detected networks in step 520. The user may select an item to be used for sorting the networks. According to an exemplary embodiment of the present invention, the roaming charge item may be used to sort the networks in order. If the mobile terminal is configured to sort the networks in order of the roaming charge, network 3 having the cheapest roaming charge is selected among the detected networks 2, 3, and 5. If the mobile terminal is configured to sort the networks in order of a user-assigned priority of FIG. 4, network 2 having the highest user-assigned priority is selected among the detected networks 2, 3 and 5. In this manner, the network selector 161 selects the network having the highest priority in step 530.

Although the description is directed to the case of using the network list of one SIM, the network selection procedure can be performed with a combination of the network lists of multiple SIMs. The network selector 161 can combine the network lists of the first and second SIMs 171 and 172 and then select the network having the highest priority from the combined network list and the corresponding SIM.

The identity module selection method according to exemplary embodiments of the present invention is capable of communicating through a roaming-cost effective or user-preferred network without cumbersome user manipulation.

As described above, the identity module selection enables the selection of one of multiple identity modules attached to a mobile terminal automatically without cumbersome user manipulation.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the exemplary embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

The mobile terminal according to an exemplary embodiment of the present invention may be a portable electronic device including a mobile phone, a Personal Digital Assistant (PDA), a navigator, a digital broadcast receiver, a Portable Multimedia Player (PMP), and the like.

While the invention has been shown and described with reference to certain exemplary embodiments thereof, it will be understood by those skilled in the art that various changes in form and details may be made without departing from the spirit and scope of the invention as defined by the appended claims and their equivalents.

What is claimed is:

1. An identity module selection method of a mobile terminal having multiple identity modules, the method comprising:
   selecting a network;
   detecting identifiers corresponding to the selected network among identifiers of multiple identity modules;
   selecting an identity module corresponding to one of the detected identifiers; and
   connecting the mobile terminal to the network using the selected identity module,
   wherein selecting the identity module comprises:
      determining whether the selected identity module differs from a currently connected identity module, and
      switching, when the selected identity module differs from the currently connected identity module, to the selected identity module.

2. The identity module selection method of claim 1, wherein the selecting of the network comprises:
   discovering connectable networks;
   determining priorities of the discovered networks; and
   selecting the network having the highest priority among the discovered networks.

3. The identity module selection method of claim 1, further comprising displaying an interface prompting to enter a priority of the network.

4. The identity module selection method of claim 1, wherein the selecting the identity module comprises:
   providing, when no identity module corresponding to the selected network is discovered, an interface prompting to enter an identifier of an identity module to match with the selected network;
   storing the entered identifier as the identifiers corresponding to the selected network; and
   selecting the identity module corresponding to the entered identifier.

5. A mobile terminal having multiple identity modules, the mobile terminal comprising:
   a network selector for selecting a network;
   an identifier detector for detecting identifiers corresponding to the selected network among identifiers of multiple identity modules;
   an identity module selector for selecting an identity module corresponding to one of the detected identifiers; and a radio frequency unit for connecting the mobile terminal to the selected network using the selected identity module, wherein the identity module selector determines whether the selected identity module differs from a currently connected identity module and switches, when the selected identity module differs from the connected identity module, to the selected identity module.

6. The mobile terminal of claim 5, wherein the network selector discovers connectable networks, determines priorities of the discovered networks, and selects the network having the highest priority among the discovered networks.

7. The mobile terminal of claim 5, further comprising a display for displaying an interface prompting to enter a priority of the network and to enter the identifiers of the identity module corresponding to the network.

8. The mobile terminal of claim 5, wherein the identity module selector provides, when no identity module corresponding to the selected network is discovered, an interface prompting to enter an identifier of an identity module to match with the selected network, stores the entered identifier as the identifiers corresponding to the selected network, and selects the identity module corresponding to the entered identifier.

9. A mobile terminal, comprising:
a plurality of identity modules;
a display unit;
a network selector for selecting a network;
an identity module controller for determining identifiers corresponding to the selected network and for selecting an identity module corresponding to one of the determined identifiers; and
a radio frequency unit for connecting the mobile terminal to the selected network via the selected identity module,
wherein the identity module controller determines whether the selected identity module differs from a currently connected identity module and switches, when the selected identity module differs from the connected identity module, to the selected identity module.

10. The mobile terminal of claim 9, wherein the network selector identifies at least one available network to which the mobile terminal may connect and selects the network based on a priority of the available networks.

11. The mobile terminal of claim 9, wherein the display unit displays a user interface to enable a user to enter a priority of the selected network.

12. The mobile terminal of claim 9, wherein, when the identity module controller determines that no identity module exists for the selected network, the identity module controller controls the display unit to display a user interface to enable a user to select an identifier of an identity module to correspond to the selected network, stores the user-selected identifier as the identifiers corresponding to the selected network, and selects the identity module corresponding to the user-selected identifier.

13. The mobile terminal of claim 9, wherein the network selector selects the network based on a billing scheme of the network.

14. The mobile terminal of claim 9, wherein the plurality of identity modules are Subscriber Identity Modules (SIMs).

15. The identity module selection method of claim 4, wherein the providing of the interface comprises displaying identifiers of identity modules that are connectable to the selected network.

* * * * *